United States Patent
Zhang et al.

(10) Patent No.: US 8,249,449 B2
(45) Date of Patent: Aug. 21, 2012

(54) NETWORK NODE, BUFFER DEVICE, AND SCHEDULING METHOD

(75) Inventors: Yi Zhang, Shenzhen (CN); Yongkang Pan, Chengdu (CN); Qingbo Su, Chengdu (CN); Sheng Wang, Chengdu (CN); Du Xu, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 541 days.

(21) Appl. No.: 12/469,385

(22) Filed: May 20, 2009

(65) Prior Publication Data

US 2009/0252493 A1 Oct. 8, 2009

Related U.S. Application Data

(63) Continuation of application No. PCT/CN2007/070737, filed on Sep. 20, 2007.

(30) Foreign Application Priority Data

Dec. 26, 2006 (CN) .......................... 2006 1 0168222

(51) Int. Cl.
*H04J 14/00* (2006.01)
(52) U.S. Cl. .............................. 398/47; 398/45; 398/46
(58) Field of Classification Search ................ 398/45–54
See application file for complete search history.

(56) References Cited

U.S. PATENT DOCUMENTS

| 5,402,256 | A | | 3/1995 | Spanke |
| 5,416,769 | A | * | 5/1995 | Karol ............................ 370/414 |
| 7,499,650 | B2 | | 3/2009 | Wang et al. |
| 2002/0118419 | A1 | * | 8/2002 | Zheng et al. ................... 359/139 |
| 2002/0118421 | A1 | * | 8/2002 | Xiong et al. ................... 359/140 |
| 2003/0002105 | A1 | | 1/2003 | Wang et al. |
| 2004/0208418 | A1 | | 10/2004 | Handelman |

(Continued)

FOREIGN PATENT DOCUMENTS

CN 1114805 A 1/1996

(Continued)

OTHER PUBLICATIONS

Sasayama et al., "FRONTIERNET: Frequency-Routing-Type Time-Division Interconnection Network," *Journal of Lightwave Technology*, 15(3): 417-429 (Mar. 1997).

(Continued)

*Primary Examiner* — Dzung Tran
(74) *Attorney, Agent, or Firm* — Leyig, Voit & Mayer, Ltd.

(57) ABSTRACT

A buffer device includes at least one internal switching unit and at least one basic buffer unit. The internal switching unit includes at least two inputs and at least two outputs. The internal switching unit and the basic buffer unit form a closed connection by alternating with each other via one input of the two inputs and one output of the two outputs. Another one of the at least two inputs of the internal switching unit receives a light wave. The internal switching unit outputs the light wave according to a first control signal. The basic buffer unit buffers the lightwave from the internal switching unit. At the same time, a network node and a scheduling method are also provided. A network node with the buffer device has a small scale and is easy to realize, while the data packet loss rate is decreased and the head of line blocking is avoided.

6 Claims, 6 Drawing Sheets

U.S. PATENT DOCUMENTS

| | | | |
|---|---|---|---|
| 2005/0053375 A1* | 3/2005 | Yoo et al. | 398/53 |
| 2005/0152351 A1* | 7/2005 | Wang et al. | 370/387 |

FOREIGN PATENT DOCUMENTS

| | | |
|---|---|---|
| CN | 1360413 A | 7/2002 |
| CN | 1381963 A | 11/2002 |
| CN | 1472969 A | 2/2004 |
| CN | 1540907 A | 10/2004 |
| CN | 1642061 A | 7/2005 |
| CN | 1717113 A | 1/2006 |
| CN | 101212818 B | 12/2010 |
| EP | 1 217 863 A2 | 6/2002 |
| JP | 6-113348 A | 4/1994 |
| WO | WO 91/04642 A2 | 4/1991 |

OTHER PUBLICATIONS

Shell et al., "Performance of All-Optical Shared Memory Architecture Packet Switch Networks Using Channel Grouping Under Bursty Traffic," *IEEE*, Workshop on High Performance Switching and Routing, 208-212 (May 29, 2001).

English Translation of Written Opinion of International Patent Application No. PCT/CN2007/070737.

International Search Report in corresponding PCT Application No. PCT/CN2007/070737 (Jan. 3, 2008).

Gauger, Dimensioning of FDL Buffers for Optical Burst Switching Nodes, Institute of Communication Networks and Computer Engineering (IND), University of Stuttgart, 2002, Stuttgart, Germany.

Hunter et al., "Buffering in Optical Packet Switches," Journal of Lightwave Technology, Dec. 1998, vol. 16, No. 12, Institute of Electronic and Electrical Engineers, Geneva, Switzerland.

Li et al., "A Novel Fiber Delay Line Buffering Architecture for Optical Packet Switching," Proceedings of the IEEE 2003 Global Communications Conference, GlOBECOM2003, 2003, Institute of Electronic and Electrical Engineers, San Francisco, California.

Merchant et al., "Performance Evaluation of a Router with Tunable Recirculating Buffers in an Optical Burst Switching Environment," University of Southern California, 2004, Los Angeles, California.

Xu et al., "Techniques for Optical Packet Switching and Optical Burst Switching," Internet Technology Series, IEEE Communications Magazine, Jan. 2001, Institute of Electronic and Electrical Engineers, Geneva, Switzerland.

Yang et al., "Contention Resolution Strategy in Optical Packet Switching Network," The State Key Laboratory on Fiber-optic Local Area Networks and Advanced Optical Communication Systems, Mar. 25, 2004, Shanghai Jiaotong University, Shanghai, China.

Yang et al., "Optical Switching Fabric Architecture Incorporating Rapidly Switching All-Optical Variable Delay Buffers," Department of Electrical and Computer Engineering, University of California, 2004, The Optical Society of America, Davis, California.

Yoo et al., "QoS Performance of Optical Burst Switching in IP-Over-WDM Networks," IEEE Journal on Selected Areas in Communications, Oct. 2000, vol. 18, No. 10, Institute of Electronic and Electrical Engineers, Geneva, Switzerland.

\* cited by examiner

NETWORK NODE, BUFFER DEVICE, AND SCHEDULING METHOD

CROSS-REFERENCE TO RELATED APPLICATIONS

This application is a continuation of International Patent Application No. PCT/CN2007/070737, filed Sep. 20, 2007, which claims priority to Chinese Patent Application No. 200610168222.X, filed Dec. 26, 2006, both of which are hereby incorporated by reference in their entirety.

FIELD OF THE TECHNOLOGY

The present invention relates to the field of optical network technology, and more particularly to a network node, a buffer device, and a scheduling method in an optical packet switching network.

BACKGROUND

With the rapid growth of packet services, the communication network design in the future shall mainly aim at optimization and support of packets. The optical network packet switching technology is capable of broadening the existing network bandwidth, and a network node has a high information throughput, which is suitable for supporting a packet service that is highly unexpected and frequently changed, especially an IP service.

Nowadays, an optical packet switching network generally consists of edge nodes and a core node connected by a dense wavelength division multiplexing (DWDM) fiber link. A data packet is transmitted from an edge node through the DWDM fiber link to arrive at the core node, is then switched by a switching module of the core node, and is finally sent to a destination edge node.

FIG. 1 shows a scheme of a feedforward connection of a core node structure. The structure has P ingress ports corresponding to P egress ports, each port having M wavelengths, and employing a switching matrix of a PM×PM scale. That is, the switching matrix includes PM ingress ports and PM egress ports. A wavelength conversion is performed by a tunable wavelength converter (TWC) on a light wave output from a wavelength division demultiplexer in the connection scheme, and then the light wave enters an optical buffer. The light wave output from the optical buffer enters a combiner of a corresponding output port via the switching matrix of the PM×PM scale. A structure of the optical buffer is shown in FIG. 2, in which each multi-level buffer unit fiber delay line (FDL) consists of four single-level FDLs.

The feedforward connection scheme has the following disadvantages. Since a dedicated multi-level FDL is configured for each wavelength, a large number of FDLs are required, so that the scale of the core node is large. Moreover, a single-plane switching matrix structure, i.e., the switching matrix structure of the PM×PM scale is employed, and the switching matrix consists of switches. If the switch is represented by a 1×2 basic optical switch, the required number of the basic optical switches is 2×PM (PM−1). As a result, the core node has an even larger scale and is difficult to be implemented in an integrated way. Since the optical buffer employs a linear connection structure, the number of the FDLs is limited, and an upper limit of buffer time exists. When the buffer time required by the data packet exceeds the upper limit, the data packet can only be discarded. Since the employed optical buffer is before the switching plane, the problem of head of line blocking exists. That is to say, for two burst data having the same wavelength coming successively from the same ingress port to arrive at different egress ports, if the former burst data is delayed in the optical buffer to a time overlapping the time when the latter burst data exits the optical buffer, the latter burst data is inevitably discarded in the situation that actually the switching plane is idle, and cannot be sent to the corresponding egress port.

SUMMARY

The embodiments of the present invention are directed to a network node, a buffer device, and a scheduling method, so as to reduce the scale of a core node and design a practical core node.

In order to solve the above technical problem, the objective of the embodiments of the present invention is realized through the following technical schemes.

A buffer device is provided. The buffer device includes at least one internal switching unit and at least one basic buffer unit. The internal switching unit includes at least two inputs and at least two outputs. The internal switching unit and the basic buffer unit form a closed connection by alternating with each other via one of the at least two inputs and one of the at least two outputs. Another one of the at least two inputs of the internal switching unit receives a light wave. The internal switching unit outputs the light wave according to a first control signal. The basic buffer unit is adapted to buffer the light wave from the internal switching unit.

Preferably, the internal switching unit outputs the light wave to the basic buffer unit or from another one of the at least two outputs according to the first control signal.

Preferably, when the buffer device includes at least two internal switching units and each of the internal switching units includes three or more inputs and three or more outputs, the at least two internal switching units are concatenated to form a closed connection by themselves.

A network node is provided. The network node includes a wavelength division demultiplexer, at least one buffer device, and at least one combiner one-to-one corresponding to the at least one buffer device.

The wavelength division demultiplexer is adapted to divide a received wavelength signal and output a light wave obtained by a division to the buffer device.

The buffer device includes at least one internal switching unit and at least one basic buffer unit. The internal switching unit includes at least two inputs and at least two outputs. The internal switching unit and the basic buffer unit form a closed connection by alternating with each other via one of the at least two inputs and one of the at least two outputs. Another one of the at least two inputs of the internal switching unit receives the light wave. The internal switching unit outputs the light wave according to a first control signal. The basic buffer unit is adapted to buffer the light wave from the internal switching unit.

The at least one combiner is adapted to multiplex and output the light wave from the internal switching unit of the buffer device.

Preferably, the internal switching unit outputs the light wave to one of the basic buffer unit or to the at least one combiner from another one of the at least two outputs according to the first control signal.

Preferably, the network node further includes a TWC between the wavelength division demultiplexer and the buffer device.

The TWC is adapted to perform a wavelength conversion on the light wave output from the wavelength division demultiplexer, and output a converted light wave to the buffer device.

Preferably, the network node further includes an optical switch between the TWC and the buffer device.

The optical switch is adapted to transmit the light wave output from the TWC to the buffer device according to a second control signal.

Preferably, when the buffer device includes at least two internal switching units and each of the internal switching units includes three or more inputs and three or more outputs, the at least two internal switching units are concatenated to form a closed connection by themselves.

A scheduling method for transmitting a data packet in an optical network is provided. The scheduling method includes the following steps.

Step A: A path is determined according to a usage level.

Step B: It is judged whether each of basic buffer units is capable of being reserved according to egress port status information of an internal switching unit upstream to each of the basic buffer units on the path; if each of the basic buffer units is capable of being reserved, it is judged whether a first port of an internal switching unit connected to an output of a last basic buffer unit is capable of being reserved according to egress port status information of the internal switching unit connected to the output of the last basic buffer unit on the path; and if the first port of the internal switching unit connected to the output of the last basic buffer unit is capable of being reserved, data packet is transmitted through the path, and the egress port status information of each of the internal switching units on the path is updated.

Preferably, Step B includes the following steps.

Step B1: It is judged whether a level m of a basic buffer unit that currently succeeds in reservation is smaller than the usage level, and if the level m of the basic buffer unit that currently succeeds in reservation is smaller than the usage level, step B2 is performed; if the level m of the basic buffer unit that currently succeeds in reservation is not smaller than the usage level, step B3 is performed.

Step B2: It is judged whether a second port of an $(n+1)^{th}$ level internal switching unit connected to a downstream basic buffer unit is capable of being reserved according to egress port status information of the $(n+1)^{th}$ level internal switching unit connected to an output of an $m^{th}$ level basic buffer unit on the path, and if the second port of the $(n+1)^{th}$ level internal switching unit connected to the downstream basic buffer unit is capable of being reserved, m is increased by 1 and a level n of the internal switching units that have been used is increased by 1, and the flow returns to step B1.

Step B3: It is judged whether a first port of the $(n+1)^{th}$ level internal switching unit is capable of being reserved according to the egress port status information of the $(n+1)^{th}$ level internal switching unit connected to the output of the $m^{th}$ level basic buffer unit on the path, and if the first port of the $(n+1)^{th}$ level internal switching unit is capable of being reserved, the data packet is output through the path and from the first port of the $(n+1)^{th}$ level internal switching unit, and the egress port status information of each internal switching unit on the path is updated.

The variable m represents the level of the basic buffer unit that currently succeeds in reservation, and is assigned with an initial value of 0. The variable n represents a number of the internal switching units that have been used, and is assigned an initial with value of 0.

Preferably, the internal switching unit is a 3×3 optical switch. Step B2 further includes the following step.

When the second port of the $(n+1)^{th}$ level internal switching unit is incapable of being reserved, Step B21 is performed. Step B21 is as follows: It is judged whether a third port of the $(n+1)^{th}$ level internal switching unit connected to a downstream internal switching unit is capable of being reserved according to the egress port status information of the $(n+1)^{th}$ level internal switching unit; and if the third port of the $(n+1)^{th}$ level internal switching unit connected to the downstream internal switching unit is capable of being reserved, n is increased by 1, and the flow returns to step B2.

Preferably, Step B2 further includes the following steps.

When the second port of the $(n+1)^{th}$ level internal switching unit is capable of being reserved, it is recorded that the second port of the $(n+1)^{th}$ level internal switching unit is requested. When the third port of the $(n+1)^{th}$ level internal switching unit is capable of being reserved, it is recorded that the third port of the $(n+1)^{th}$ level internal switching unit is requested. When neither the second port nor the third port of the $(n+1)^{th}$ level internal switching unit is capable of being reserved, Step B22 is performed. Step B22 is as follows: It is judged whether a third port of an $n^{th}$ level internal switching unit is requested. If the third port of the $n^{th}$ level internal switching unit is not requested, m is reduced by 1, n is reduced by 1, and the flow returns to step B21; and if the third port of the $n^{th}$ level internal switching unit is requested, n is reduced by 1 and the flow returns to step B22.

Preferably, before judging whether the level m of the basic buffer unit that currently succeeds in reservation is smaller than the usage level, Step B1 further includes judging whether n is larger than a preset maximum cycle depth. If n is not larger than a preset maximum cycle depth, the flow continues; and if n is larger than a preset maximum cycle depth, the data packet is lost.

Preferably, before Step A, the method further includes acquiring wavelength status information according to the data packet and calculating the usage level of the basic buffer unit according to the wavelength status information.

When it is determined that the first port of the internal switching unit connected to the output of the last basic buffer unit is capable of being reserved, Step B3 further includes updating the wavelength status information.

As can be seen from the above technical schemes, the embodiments of the present invention have the following beneficial effects.

(1) The embodiments of the present invention employ the buffer device in which the internal switching units and the basic buffer units form a closed connection by alternating with each other, so that the internal switching units and the basic buffer units can be utilized cyclically and the scale of the buffer devices is small, thereby reducing the scale of the core node. The embodiments of the present invention provide 1×N optical switches to realize the switching function, which has a smaller scale than that of the single-plane switching matrix structure in the conventional art, thereby further reducing the scale of the core node.

The comparison between the scale of the network node provided in an embodiment of the present invention and that of the node in the conventional art is shown in Table 1. It is assumed that four ingress ports each having eight wavelengths. Then, the switching structure of 1×PM×PM has a 1×32×32 scale. The basic buffer unit in the network node structure provided in an embodiment of the present invention also employs a currently common single-level FDL. The optimal value of a delay granularity of the single-level FDL in the conventional art is 40 μs, while the optimal delay granularity provided in an embodiment of the present invention is 20 μs. Therefore, the delay granularity of two single-level FDLs in an embodiment of the present invention should be equivalent to that of one single-level FDL in the conventional art. The basic optical switch represents a 1×2 or 2×1 optical switch. As can be seen from Table 1, the number of elements used in the technical schemes provided in an embodiment of the present invention is smaller than that in the conventional art, and thus the scale of the core node is smaller than that in the conventional art.

TABLE 1

Comparison Table for Scale of Core Node

| Elements | Conventional art | An embodiment of the present invention |
|---|---|---|
| Number of basic optical switches | 2112 | 608 |
| Wavelength division demultiplexer | 4 | 4 |
| Combiner | 132 | 4 |
| FDL | 128 | 128 |

(2) The closed buffer device provided in the embodiments of the present invention provides a buffering manner with infinite delay, provides a sufficient delay time for a data packet requiring a large delay time, and thus reduces the loss rate of the data packet.

(3) The network node provided in an embodiment of the present invention is configured with optical switches, so that data packets destined for different egress ports are sent to corresponding buffer devices, and then sent to combiners at the egress ports through internal scheduling of the buffer devices, thereby avoiding the problem of head of line blocking.

DETAILED DESCRIPTION

A buffer device is provided in an embodiment of the present invention. The buffer device includes at least one internal switching unit and at least one basic buffer unit. The internal switching unit includes at least two inputs and at least two outputs. The internal switching unit and the basic buffer unit form a closed connection by alternating from each other via one of the at least two inputs and one of the at least two outputs. Another one of the at least two inputs of the internal switching unit receives a light wave. The internal switching unit outputs the light wave according to a first control signal. The basic buffer unit is adapted to buffer the light wave from the internal switching unit. At the same time, a network node and a scheduling method are also provided in an embodiment of the present invention. In order to make the technical schemes of an embodiment of the present invention comprehensible, an embodiment of the present invention is illustrated below in detail with reference to the accompanying drawings and embodiments.

Figure 1:
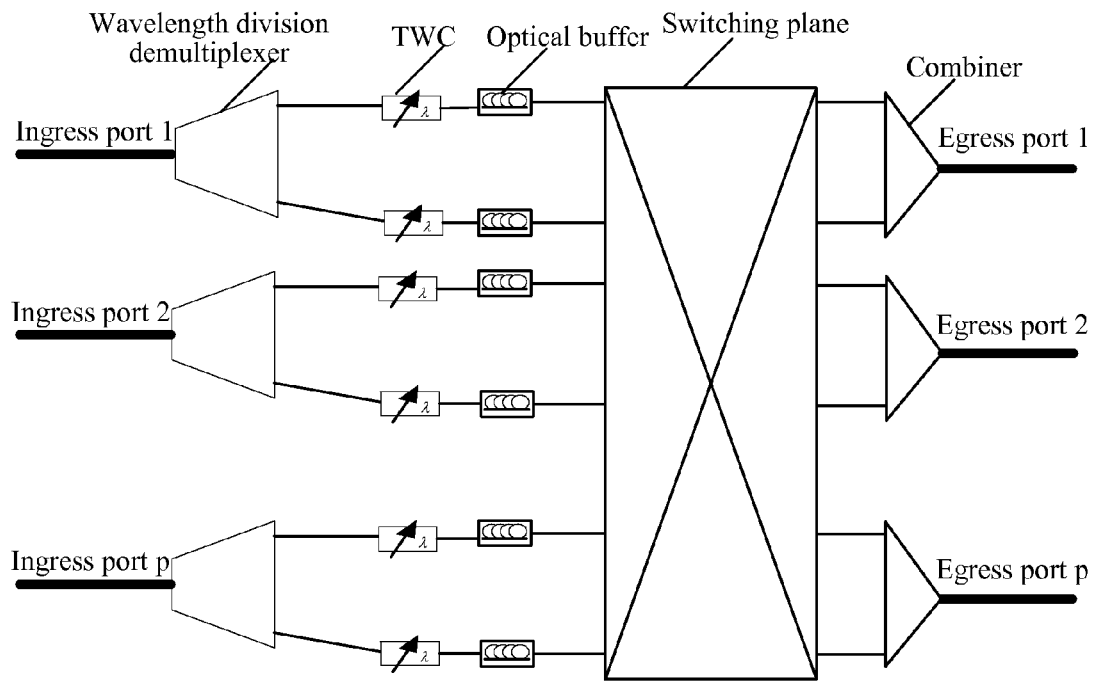
FIG. 1 is a structural view of a core node.
Figure 2:
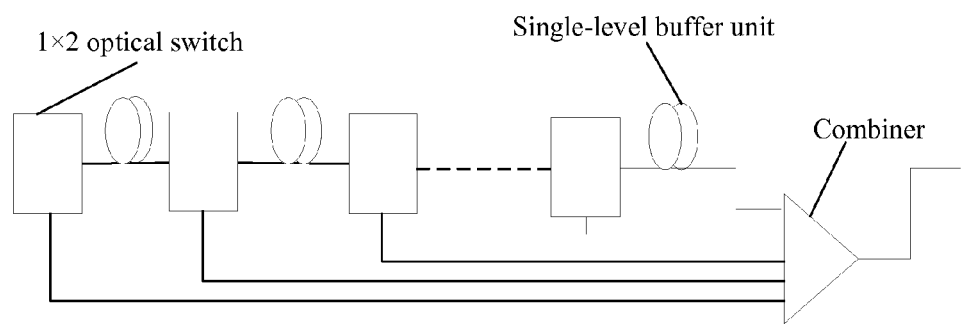
FIG. 2 is a structural view of an optical buffer.
Figure 3:
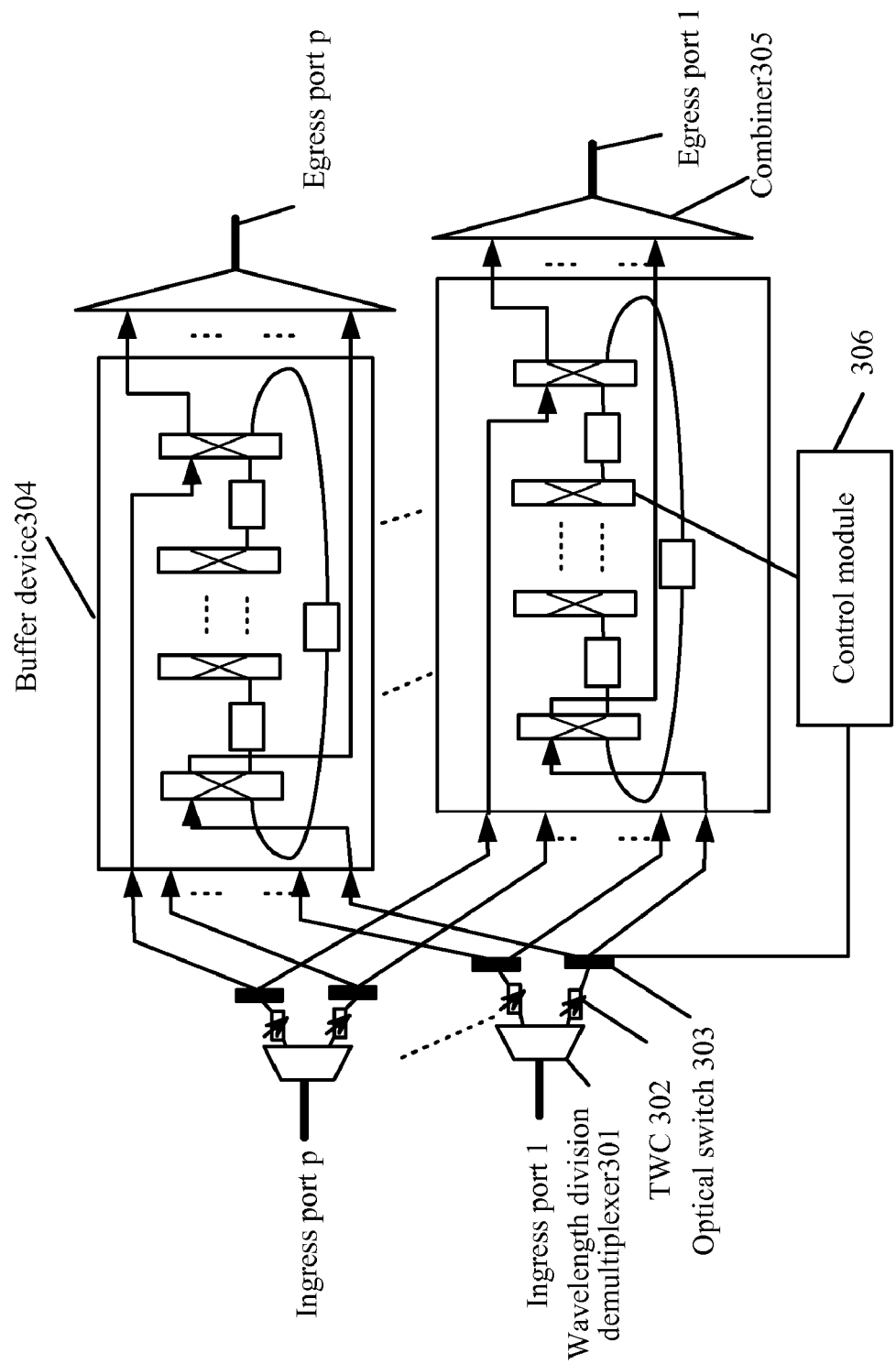
FIG. 3 is a structural view of a network node provided in an embodiment of the present invention.

Referring to FIG. 3, the network node provided in an embodiment of the present invention includes wavelength division demultiplexer 301, 1×P switch 303, TWC 302, buffer device 304, combiner 305, and control module 306. Light wave signals of M wavelengths multiplexed on fiber links of input ports are respectively connected to the TWCs 302 through M fibers after passing through the wavelength division demultiplexers 301. The light wave signal output from each TWC 302 is connected to one 1×P optical switch 303. P egresses of the optical switches 303 are one-to-one corresponding to the P buffer devices 304. One buffer device 304 is corresponding to one egress port, and outputs of the buffer devices 304 are all connected to the combiners 305 at corresponding egress ports. By configuring the optical switches 303, data packets destined for different egress ports are sent to corresponding buffer devices 304 and then sent to the combiners 305 at the egress ports through internal scheduling of the buffer devices 304. When only one egress port and correspondingly only one buffer device and combiner exist, the optical switches 303 may be omitted. A light wave signal bearing data packet control information is transmitted to a control module 306 after a photoelectric conversion. The control module 306 determines an egress port according to a wavelength status table, i.e., determines a corresponding buffer device, and generates a second control signal to control an optical switch 303, so that the light wave signal is transmitted to the corresponding buffer device. The control module 306 determines a path of the light wave signal in the buffer device 304 according to the wavelength status table and an egress port status table of an internal switching unit, and generates a first control signal to control the buffer device 304.

Figure 4:
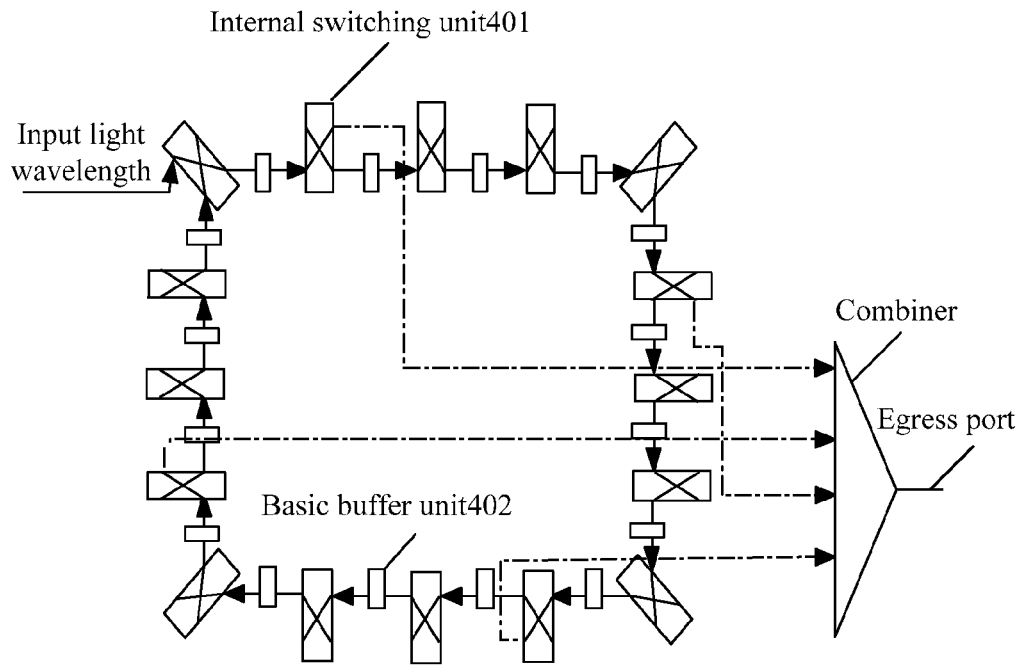
FIG. 4 is a structural view of a ring buffer device provided in an embodiment of the present invention.
Figure 5:
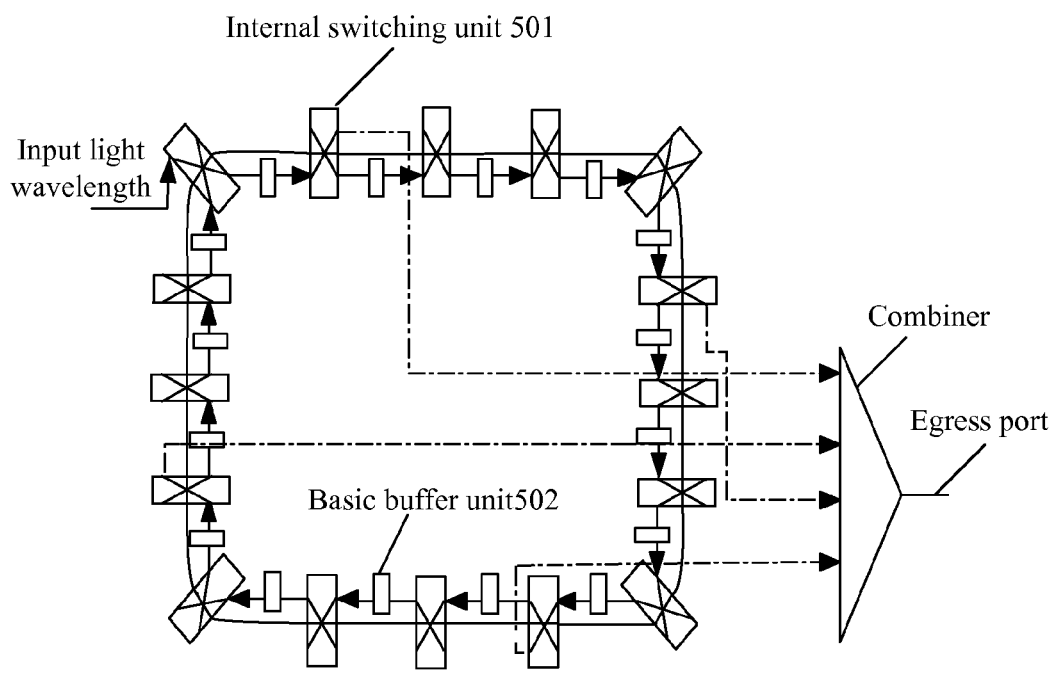
FIG. 5 is a structural view of a ring buffer device provided in an embodiment of the present invention.

The buffer device 304 is a ring buffer device. Referring to FIG. 4, inside the buffer device 304, only simple 2×2 optical switches are used as internal switching units 401 and form a ring, i.e., a single-level BMU ring with basic buffer units BMUs 402 by alternating with each other. The buffer device is a single-ring buffer device. The single-ring buffer device includes P×M 2×2 optical switches 401 and P×M BMUs 402. The other ingress port of each 2×2 optical switch 401 is connected to an input light wave, and the corresponding egress port is connected to a combiner. The BMU 402 is adapted to buffer the light wave from the internal switching unit. Referring to FIG. 5, an internal switching unit 501 of the buffer device employs a 3×3 optical switch, in which two pairs of ports are connected in the same manner as in FIG. 4 to form a single-level BMU ring, and a third pair of ports is directly concatenated to each other to form a ring, i.e., a non-BMU ring, via a fiber. The buffer device has two rings inside, namely, a single-level BMU ring and a non-BMU ring, and the buffer device is a dual-ring buffer device. The buffer device 304 may also employ a 4×4 optical switch as the internal switching unit, in which two ingress ports are connected to an ingress wavelength arriving at the buffer device and two corresponding egress ports are connected to a combiner, and the other two pairs of ports are connected in the same manner as in FIG. 5, so as to form a single-level BMU ring and a non-BMU ring. The internal switching unit in the buffer device outputs the light wave signal to the combiner or outputs the light wave signal to the basic buffer unit under the action of a first control signal from the control module 306.

The TWC is adapted to perform a wavelength conversion on the light wave, and the use of the TWC helps to solve a data packet collision. When multiple signals of the same wavelength are to be switched to the same wavelength of the same output port at the same time, collision signals may be respectively converted to other idle wavelengths of the output port, thereby avoiding the collision. The realization of an embodiment of the present invention is not influenced without using the TWC. In the case of no TWC, when multiple signals of the same wavelength are to be switched to the same wavelength of the same output port at the same time, only the BMU instead of the idle wavelength can be used to buffer the signals of the same wavelength and then successively send them to the wavelength of the same output port.

Figure 6:
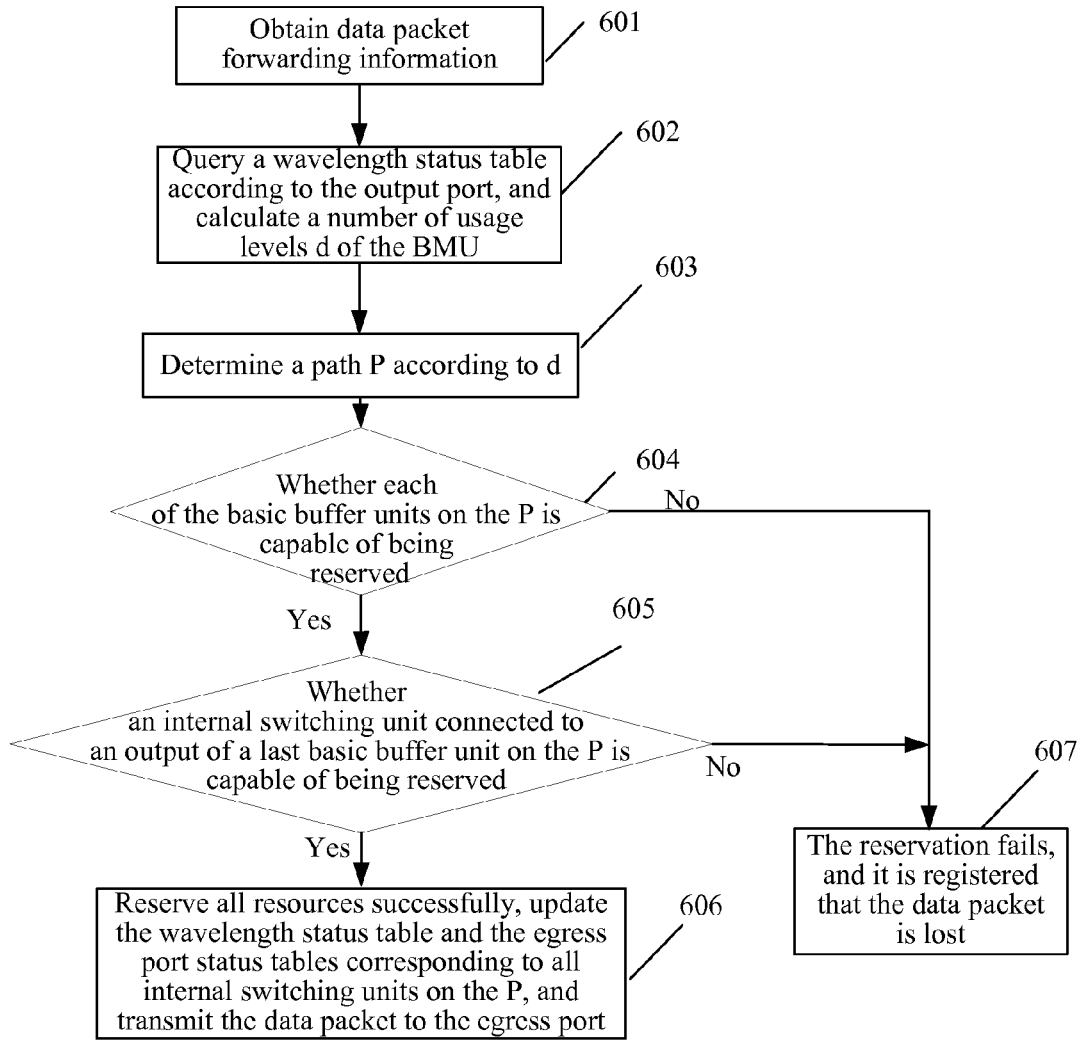
FIG. 6 is a flow chart of a scheduling provided in an embodiment of the present invention.

The data packets are transmitted by using the light wave as a carrier, and possibly collide with each other between an ingress port and an egress port. The following two main collision possibilities exist when the network node provided in an embodiment of the present invention is used. One is egress wavelength collision. When two data packets are from different ingress ports and are required to be destined for a certain specific wavelength channel of the same egress port, a collision occurs. Such collision resulted from the competition for the wavelength channel of the egress port is referred to as the "egress wavelength collision." The other is a collision inside the buffer device. When two data packets entering the buffer device intend to occupy the same BMU resource at the same time, a collision occurs at an ingress of the BMU, i.e., an egress of the internal switching unit connected to the BMU. The network node provided in an embodiment of the present invention has such two types of collisions, and thus needs to maintain two kinds of status tables, namely, a wavelength status table and an egress port status table of the internal switching unit, so as to record the occupation condition of the two resources. A scheduling method provided in an embodiment of the present invention is shown in FIG. 6. The method includes the following steps.

Step 601: Data packet forwarding information is obtained. The information includes a time of arrival, arrT, a data packet duration time, durT, an input port, an ingress wavelength, and an output port.

Step 602: A corresponding wavelength status table is queried according to the output port, and a usage level d of the BMU is calculated according to the wavelength status table. The wavelength status table is a usage condition of each wavelength on a fiber link of the output port.

Step 603: A path P is determined according to the usage level d. The path P includes internal switching units and basic buffer units.

Step 604: It is judged whether all basic buffer units can reserve resources according to an egress port status table of an internal switching unit upstream to each basic buffer unit on the path P, and if yes, Step 605 is performed; otherwise, Step 607 is performed.

Step 605: It is judged, according to an egress port status table of an internal switching unit connected to an output of a last basic buffer unit on the path P, whether a first port of the internal switching unit connected to the output of the last basic buffer unit is capable of being reserved, and if yes, Step 606 is performed. Otherwise, Step 607 is performed.

Step 606: The data packet passes through the path and is output from the first port of the internal switching unit connected to the output of the last basic buffer unit, the wavelength status table and an egress port status table of each internal switching unit on the path P are updated, and the scheduling is ended.

Step 607: The reservation fails, and it is registered that the data packet is lost.

Figure 7:
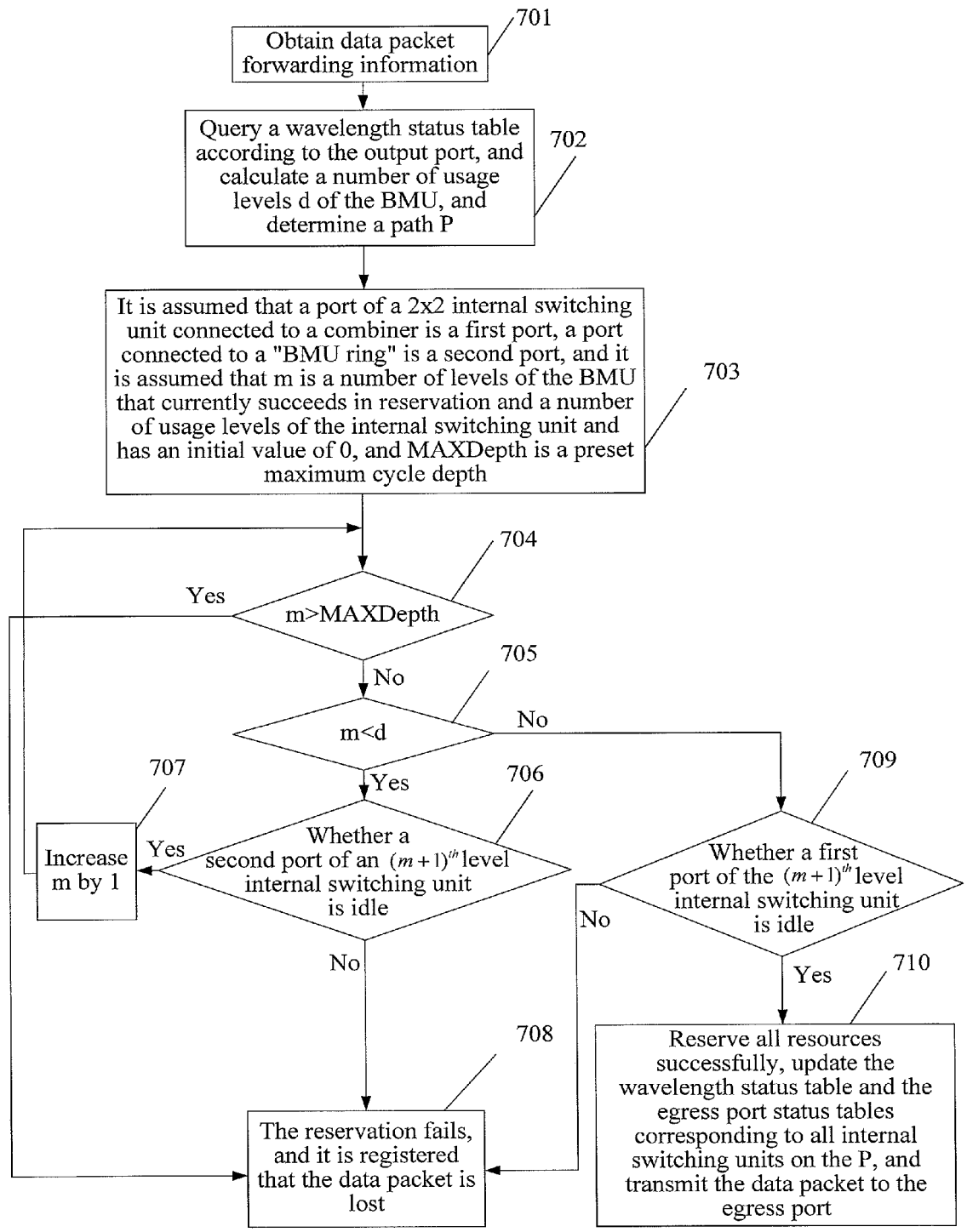
FIG. 7 is a flow chart of a scheduling of a single-ring buffer device provided in an embodiment of the present invention.

Referring to the structural view of the ring buffer device shown in FIG. 4, a flow of the scheduling method provided in an embodiment of the present invention is shown in FIG. 7. The method includes the following steps.

Step 701: Data packet forwarding information is obtained. The information includes a time of arrival, arrT, a data packet duration time, durT, an input port, an ingress wavelength, and an output port.

Step 702: A corresponding wavelength status table is queried according to the output port, a usage level d of the BMU is calculated, and a path P in which the internal switching units alternate with basic buffer units starting from an internal switching unit that the ingress wavelength enters is determined.

Step 703: It is assumed that a port of a 2×2 internal switching unit connected to a combiner is a first port, a port connected to a "BMU ring" is a second port, and it is assumed that m is a level of the BMU that currently succeeds in reservation and has an initial value of 0. Since the internal switching units and the BMUs form a ring while alternating with each other in the single-ring buffer device, m is a usage level of the internal switching unit at the same time, and MAXDepth is a preset maximum cycle depth, i.e., the allowed maximum number of buffer levels.

Step 704: It is judged whether m is larger than MAXDepth, and if yes, Step 708 is performed. Otherwise, Step 705 is performed. m is compared with MAXDepth to avoid a too long delay time of the data packet and a waste of resources.

Step 705: It is judged whether m is smaller than d, and if yes, Step 706 is performed. Otherwise, Step 709 is performed.

Step 706: It is judged whether an $(m+1)^{th}$ level basic buffer unit is capable of being reserved, i.e., it is judged whether resources of a second port of an $(m+1)^{th}$ level internal switching unit are idle in a time period of (arrT+m*g, arrT+m*g+durT), and if yes, Step 707 is performed. Otherwise, Step 708 is performed. The above mentioned g is a delay granularity having an optimal value of 20 μs.

Step 707: m is increased by 1, and the flow returns to Step 704.

Step 708: The reservation fails, it is registered that the data packet is lost, and the scheduling is ended.

Step 709: It is judged whether resources of a first port of the $(m+1)^{th}$ level internal switching unit are idle in the time period of (arrT+m*g, arrT+m*g+durT), and if yes, Step 710 is performed. Otherwise, the flow returns to Step 708.

Step 710: The reservation succeeds, the wavelength status table and egress port status tables of all internal switching units on the path P are updated, the data packet is transmitted to the egress port, and the scheduling is ended.

Figure 8:
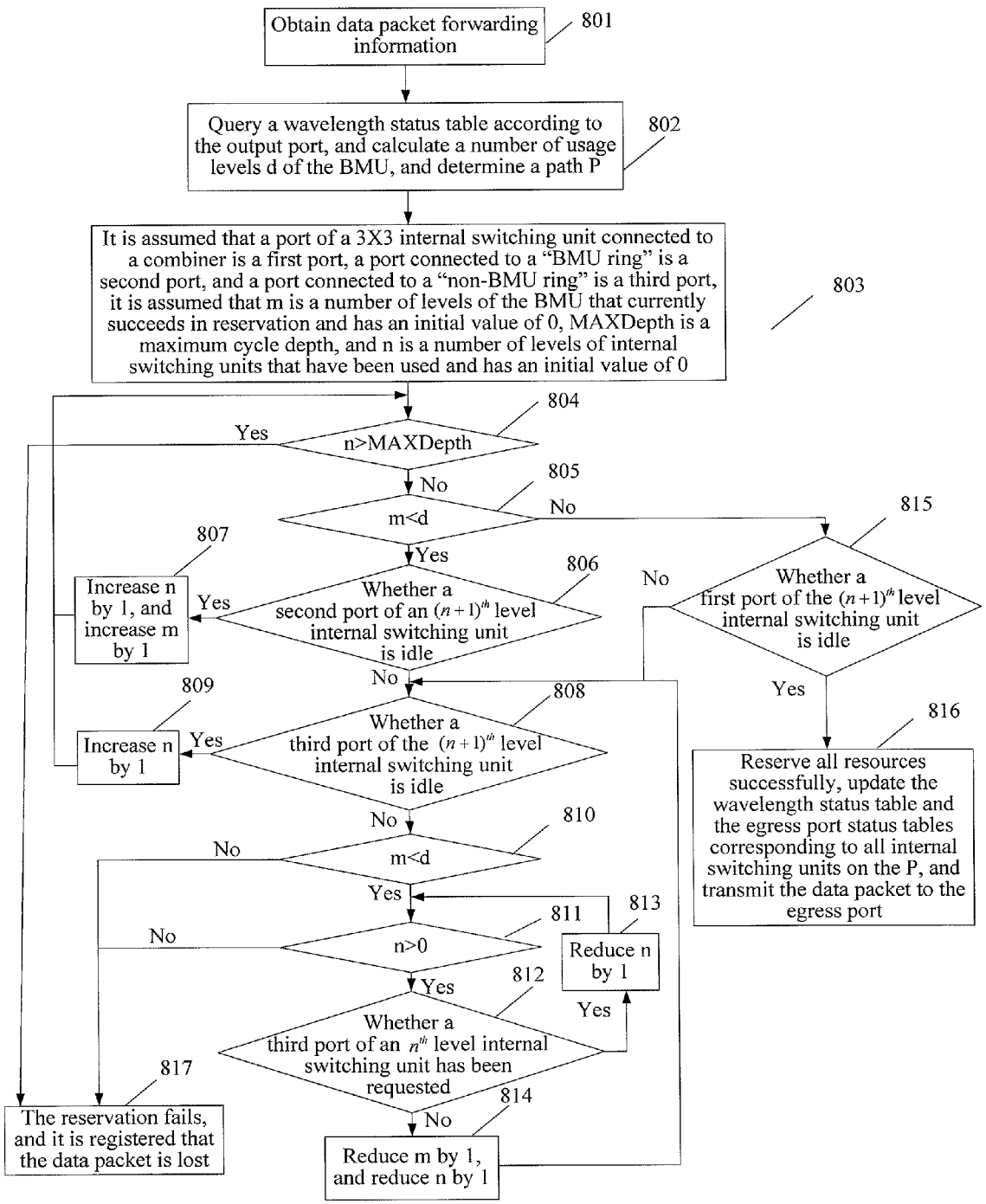
FIG. 8 is a flow chart of a scheduling of a dual-ring buffer device provided in an embodiment of the present invention.

Referring to the structural view of the ring buffer device shown in FIG. 5, a flow of the scheduling method provided in an embodiment of the present invention is shown in FIG. 8. The method includes the following steps.

Step 801: Data packet forwarding information is obtained. The information includes a time of arrival, arrT, a data packet duration time, durT, an input port, an ingress wavelength, and an output port.

Step 802: A corresponding wavelength status table is queried according to the output port, a delay level d of the BMU is calculated, and a path P including internal switching units and d basic buffer units is determined according to the delay level d.

Step 803: It is assumed that a port of a 3×3 internal switching unit connected to a combiner is a first port, a port connected to a "BMU ring" is a second port, and a port connected to a "non-BMU ring" is a third port, it is assumed that a variable m is a level of the BMU that currently succeeds in reservation and is assigned an initial value of 0, and a variable n is a number of switching units that have been used and is assigned with an initial value of 0, and it is assumed that MAXDepth is a maximum cycle depth.

Step 804: It is judged whether n is larger than MAXDepth, and if yes, Step 817 is performed. Otherwise, Step 805 is performed. n is compared with MAXDepth to avoid a dead cycle of the light wave in the non-BMU ring.

Step 805: It is judged whether m is smaller than d, and if not, Step 815 is performed. Otherwise, Step 806 is performed.

Step 806: It is judged whether resources of a second port of an $(n+1)^{th}$ level internal switching unit are idle in a time period of (arrT+m*g, arrT+m*g+durT), and if yes, Step 807 is performed. Otherwise, Step 808 is performed.

Step 807: The usage level n of the internal switching unit is increased by 1, the resource reservation level m of the BMU is increased by 1, it is recorded that the second port of the $(n+1)^{th}$ level internal switching unit is requested, and the flow returns to Step 804.

Step 808: It is judged whether resources of a third port of the $(n+1)^{th}$ level internal switching unit are idle in the time period of (arrT+m*g, arrT+m*g+durT), and if yes, Step 809 is performed. Otherwise, Step 810 is performed.

Step 809: The usage level n of the internal switching unit is increased by 1, it is recorded that the third port of the $(n+1)^{th}$ level internal switching unit is requested, and the flow returns to Step 804.

Step 810: It is judged whether m is smaller than d, and if yes, Step 811 is performed. Otherwise, Step 817 is performed.

Step 811: It is judged whether n is larger than 0, and if yes, Step 812 is performed. Otherwise, Step 817 is performed.

Step 812: It is judged whether resources of a third port of an $n^{th}$ level internal switching unit have been requested, and if yes, Step 813 is performed. Otherwise, Step 814 is performed.

Step 813: n is reduced by 1, the record that the third port of the $n^{th}$ level internal switching unit is requested is cleared, and the flow returns to Step 811.

Step 814: The resource reservation level m of the BMU is reduced by 1, n is reduced by 1, the record that a second port of the $n^{th}$ level internal switching unit is requested is cleared, and the flow returns to Step 808.

Step 815: It is judged whether a first port of the $(n+1)^{th}$ level internal switching unit is idle in the time period of (arrT+m*g, arrT+m*g+durT), and if yes, Step 816 is performed. Otherwise, Step 808 is performed.

Step 816: Resources are all reserved successfully, the wavelength status table and the egress port status tables of all internal switching units on the path P are updated, the data packet is transmitted to the egress port, and the scheduling is ended.

Step 817: The resource reservation fails, it is registered that the data packet is lost, and the scheduling is ended.

In the embodiments described above, the port request condition of the internal switching unit n that has been used is recorded in the scheduling process. The judging whether the resources of the third port of the $n^{th}$ level internal switching unit have been requested in the Step 812 is based on the recorded request condition.

As can be seen from the above analysis, an embodiment of the present invention employs the buffer device in which the internal switching units and the basic buffer units form a closed connection by alternating with each other, so that the internal switching units and the basic buffer units can be utilized cyclically and the scale of the buffer devices is small, thereby reducing the scale of the core node. An embodiment of the present invention provides 1×N optical switches to realize the switching function, which has a smaller scale than that of the single-plane switching matrix structure in the conventional art, thereby further reducing the scale of the core node. The ring buffer device provided in an embodiment of the present invention provides a buffering manner with infinite delay, provides a sufficient delay time for a data packet requiring a large delay time, and thus reduces the loss rate of the data packet. The network node provided in an embodiment of the present invention is configured with optical switches, so that data packets destined for different egress ports are sent to corresponding buffer devices, and then sent to combiners at the egress ports through internal scheduling of the buffer devices, thereby avoiding the problem of head of line blocking.

Finally, it should be understood that the above embodiments are only used to explain, but not to limit the technical solution of the present invention. In spite of the detailed description of the present invention with referring to above preferred embodiments, it should be understood that various modifications, changes or equivalent replacements can be made by those skilled in the art without departing from the spirit and scope of the present invention and covered in the claims of the present invention.

What is claimed is:

1. A buffer device, comprising:
   at least two internal switching units and at least one basic buffer unit,
   wherein each of the internal switching units comprises at least two inputs and at least two outputs, the at least two internal switching units are concatenated to form a closed connection by themselves with:
   each basic buffer unit connecting to a first output of the former one of two adjacement internal switching units and a first input of the latter one of the two adjacement internal switching units, wherein the basic buffer unit is configured to buffer received light wave; and
   a first output of the last one of the internal switching units connecting to a first input of the first one of the internal switching units through a basic buffer unit;
   a second input of the first one of the internal switching units receives a light wave; and
   a second output of each internal switching unit outputs the light wave according to a first control signal.

2. The buffer device according to claim 1, wherein:
   the internal switching unit outputs the light wave to the basic buffer unit or from another one of the at least two outputs according to the first control signal.

3. A network node, comprising:
   a wavelength division demultiplexer, adapted to divide a received light wave signal and output a light wave obtained by a division;
   at least one buffer device, comprising at least two internal switching units and at least one basic buffer unit, wherein each of the internal switching units comprises at least two inputs and at least two outputs, the at least two internal switching units are concatenated to form a closed connection by themselves with:
   each basic buffer unit connecting to a first output of the former one of two adjacement internal switching units and a first input of the latter one of the two adjacement internal switching units, wherein the basic buffer unit is configured to buffer received light wave; and
   a first output of the last one of the internal switching units connecting to a first input of the first one of the internal switching units through a basic buffer unit;

a second input of the first one of the internal switching units receives a light wave; and a second output of each internal switching unit outputs the light wave according to a first control signal; and at least one combiner, one-to-one corresponding to the at least one buffer device, adapted to multiplex and output the light wave from the internal switching unit of the buffer device.

4. The network node according to claim 3, wherein:

the internal switching unit outputs the light wave to one of the basic buffer unit or to the at least one combiner from another one of the at least two outputs according to the first control signal.

5. The network node according to claim 4, wherein between the wavelength division demultiplexer and the buffer device, the network node further comprises:

a tunable wavelength converter, adapted to perform a wavelength conversion on the light wave output from the wavelength division demultiplexer and output a converted light wave to the buffer device.

6. The network node according to claim 5, wherein between the tunable wavelength converter and the buffer device, the network node further comprises:

an optical switch, adapted to transmit the light wave output from the tunable wavelength converter to the buffer device according to a second control signal.

* * * * *